(12) United States Patent
Tran et al.

(10) Patent No.: US 10,162,518 B2
(45) Date of Patent: Dec. 25, 2018

(54) REVERSIBLE DIGITAL INK FOR INKING APPLICATION USER INTERFACES

(71) Applicant: Microsoft Technology Licensing, LLC, Redmond, WA (US)

(72) Inventors: Emily Tran, Redmond, WA (US); Daniel Parish, Seattle, WA (US); Tyler R. Adams, Seattle, WA (US); L. Tucker Hatfield, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/424,276

(22) Filed: Feb. 3, 2017

(65) Prior Publication Data
US 2018/0225037 A1 Aug. 9, 2018

(51) Int. Cl.
*G06F 3/0488* (2013.01)
*G06F 3/0354* (2013.01)

(52) U.S. Cl.
CPC ...... *G06F 3/04883* (2013.01); *G06F 3/03545* (2013.01)

(58) Field of Classification Search
CPC .......................... G06F 3/04883; G06F 3/03545
See application file for complete search history.

(56) References Cited

U.S. PATENT DOCUMENTS

| | | | |
|---|---|---|---|
| 5,509,114 A * | 4/1996 | Moran | G06F 3/04883 345/443 |
| 7,123,770 B2 | 10/2006 | Raghupathy et al. | |
| 7,259,752 B1 | 8/2007 | Simmons | |
| 7,609,278 B1 | 10/2009 | Dash | |
| 8,116,569 B2 | 2/2012 | Markiewicz et al. | |
| 8,116,570 B2 | 2/2012 | Vukosavljevic et al. | |
| 2013/0194183 A1 | 8/2013 | Odgers | |
| 2014/0198082 A1 | 7/2014 | Mori et al. | |
| 2016/0005205 A1 | 1/2016 | Liang et al. | |
| 2016/0179224 A1 | 6/2016 | Zhang et al. | |
| 2016/0299606 A1* | 10/2016 | Go | G06F 3/046 |

FOREIGN PATENT DOCUMENTS

JP 2001143095 A 5/2001

OTHER PUBLICATIONS

Anderson, et al., "Integrating Corrections into Digital Ink Playback", In Proceedings of the 17th ACM International conference on Multimedia., Oct. 19, 2009, pp. 781-784.
"How to add hand-drawn sketches to Evernote on iOS devices", https://help.evernote.com/hc/en-us/articles/213493077-How-to-add-hand-drawn-sketches-to-Evernote-on-iOS-devices, Retrieved on: Dec. 8, 2016, 8 pages.

(Continued)

*Primary Examiner* — Lixi C Simpson

(57) ABSTRACT

Systems, methods, and software are disclosed herein for supporting reversible ink in a user interface to an application. In an implementation, an application receives inking input on a canvas in a user interface to the application. The application renders ink on the canvas along a path taken by the inking input and monitors for the inking input to reverse direction along the path. In response to the inking input reversing the direction along the path, the application erases at least a portion of the ink from the canvas.

20 Claims, 8 Drawing Sheets

(56) References Cited

OTHER PUBLICATIONS

"Draw and annotate with ink in Office 2016", https://support.office.com/en-us/article/Draw-and-annotate-with-ink-in-Office-2016-c00b7319-2b50-4784-8114-47593d991c5c, Retrieved on: Dec. 8, 2016, 6 pages.
Henzen, et al., "Sketching with a Low-latency Electronic Ink Drawing Tablet", In Proceedings of the 3rd international conference on Computer graphics and interactive techniques in Australasia and South East Asia, Nov. 29, 2005, pp. 51-60.
"Drawing ink lines on the computer", http://www.itchy-animation.co.uk/lines.htm, Retrieved on: Dec. 8, 2016, 22 pages.
"Creating a Scalable Ink Picture Control for Tablet PC", https://msdn.microsoft.com/en-us/library/aa480677.aspx, Published on: Mar. 2006, 25 pages.
"Draw and sketch notes on a page", https://support.office.com/en-us/article/Draw-and-sketch-notes-on-a-page-e34b425a-9431-4b73-b52d-63c44a67f67a, Retrieved on: Dec. 8, 2016, 3 pages.
"International Search Report and Written Opinion Issued in PCT Application No. PCT/US2018/015653", dated May 5, 2018, 10 Pages.

* cited by examiner

REVERSIBLE DIGITAL INK FOR INKING APPLICATION USER INTERFACES

TECHNICAL BACKGROUND

Digital inking has become a popular feature in many software applications. In many instances, a canvas is provided in a user interface to an application through which a user may supply inking input by away of a stylus, mouse, or touch gestures. The inking capabilities provide the user with an easy and natural way to interact with the application.

The eraser mode is one sub-feature of many inking implementations. When operating in an eraser mode, a user can erase ink that was previously laid down on the canvas in a way very similar to that of erasing pencil from paper. A user may need to perform an explicit action to enter an eraser mode from a draw mode, such as selecting the mode from a feature menu, selecting a button on a stylus, or flipping over the stylus to use a digital eraser element on the stylus.

In general, such explicit actions implicitly call for a pen-up action to take place prior to the explicit action of entering the eraser mode. Unfortunately, this may take the user out of a creative flow and may have other drawbacks from a more technical perspective. For instance, some applications commit ink to persistent storage upon the occurrence of a pen-up action, thus requiring relatively processor intensive operations to erase any of the ink.

OVERVIEW

Technology is disclosed herein that allows end users to erase at least a portion of an inking input by reversing direction along a path taken by the input. In an implementation, an application receives inking input on a canvas in a user interface to the application. The application renders ink on the canvas along a path taken by the inking input and monitors for the inking input to reverse direction along the path. In response to the inking input reversing the direction along the path, the application erases at least a portion of the ink from the canvas. Such a capability may be referred to informally as reversible ink in some implementations.

The foregoing Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

Figure 1:
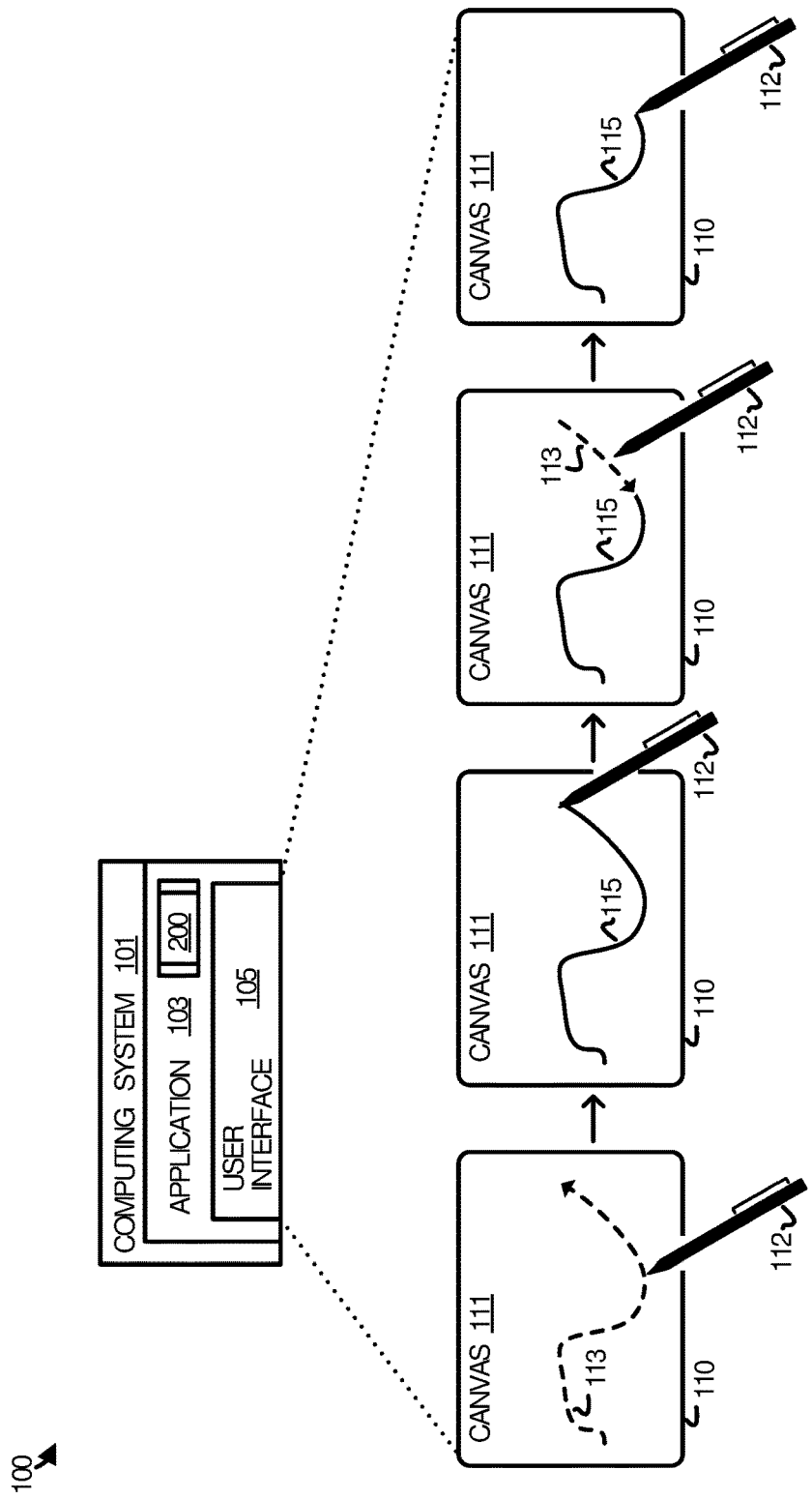
FIG. 1 illustrates an operational environment and a related operational scenario in an implementation of reversible ink.

Technology is disclosed herein that supports a reversible ink feature in a software application. In an implementation, a user is able to reverse ink that was rendered on a canvas simply by reversing direction with respect to an inking input. Ink is rendered on the canvas along a path as the user supplies an inking input by way of a stylus, mouse, touch gesture, or other suitable input mechanism. At the same time, the application monitors for the user to reverse direction along the path, in response to which at least some of the ink on the path may be erased.

In some implementations, the inking input may be supplied in a single, continuous motion where the inking instrument touches the canvas for the entirety of the input. For example, the user may make an instrument-down action on the canvas to begin an inking motion. The motion may proceed in a forward direction along a path as the user draws a line, a shape, or other such object, but then may reverse direction without picking up the drawing instrument. The previously laid-down ink may be "picked up" or erased from the canvas as the user proceeds with the motion in the reverse direction along the path. The user may change directions again, in which case the ink may be rendered again.

In other implementations, the inking input may be supplied in multiple discrete motions where the inking instrument is lifted from the canvas between one or more strokes. For example, the user may make an instrument-down action on the canvas to begin an inking motion. The motion may proceed in a forward direction as the user draws a line, a shape, or other such object, ending with an instrument-up action. The user may then begin a new motion in the reverse direction along the path, beginning with another instrument-down action. The previously laid down ink may be erase from the canvas as the user proceeds with the motion in the reverse direction along the path. The user may change directions yet again, in which case the inking may be rendered again along the same path or potentially a new path taken by the user.

A technical effect that may be appreciated from the present discussion is the increased ease with which a user may erase ink on a canvas. Rather than having to perform an explicit action to engage the erase mode of an input instrument, the user may simply reverse course over ink that was drawn on the canvas. In some implementations where the ink is still in a temporary or "wet" state, such a capability may be less processor intensive as the ink need not be handled in a committed or "dry" state.

In some implementations, the inking input may be supplied against a virtual stencil tool provided by an application. With a virtual stencil, such as ruler or protractor, the end user can draw a line guided by the stencil. The user may simply reverse direction along the stencil in order to erase ink that was just recently laid down. Stencils are thus enhanced by the reversible ink capability disclosed herein, as the user need not move, pick up, or otherwise displace the stencil in order to erase digital ink that was drawn adjacent to it.

FIG. 1 illustrates operational environment 100 in an implementation of enhanced digital inking. Operational environment 100 includes computing system 101 on which application 103 runs. Application 103 employs an inking process 200 in the context of producing views in a user interface 105. View 110 is representative a view that may be produced by application 103 in user interface 105.

Figure 8:
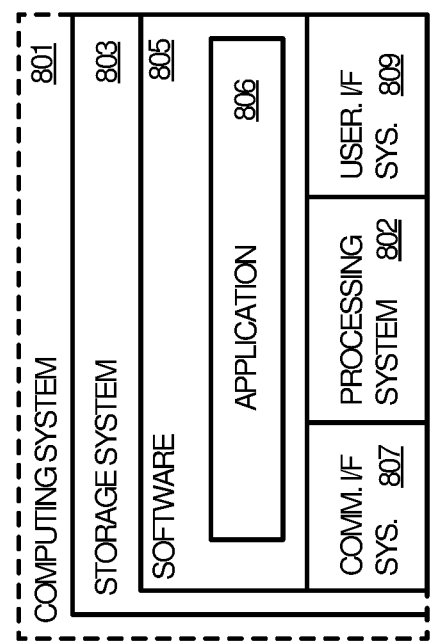
FIG. 8 illustrates a computing system suitable for implementing the software technology disclosed herein, including any of the applications, architectures, elements, processes, and operational scenarios and sequences illustrated in the Figures and discussed below in the Technical Disclosure.

Computing system 101 is representative of any device capable of running an application natively or in the context of a web browser, streaming an application, or executing an application in any other manner Examples of computing system 101 include, but are not limited to, personal computers, mobile phones, tablet computers, desktop computers, laptop computers, wearable computing devices, or any other form factor, including any combination of computers or variations thereof. Computing system 101 may include various hardware and software elements in a supporting architecture suitable for providing application 103. One such representative architecture is illustrated in FIG. 8 with respect to computing system 801.

Application 103 is representative of any software application or application component capable of reversing ink in accordance with the processes described herein. Examples of application 103 include, but are not limited to, presentation applications, diagramming applications, computer-aided design applications, productivity applications (e.g. word processors or spreadsheet applications), and any other type of combination or variation thereof. Application 103 may be implemented as a natively installed and executed application, a web application hosted in the context of a browser, a streamed or streaming application, a mobile application, or any variation or combination thereof.

View 110 is representative of a view that may be produced by a presentation application, such as PowerPoint® from Microsoft®, although the dynamics illustrated in FIG. 1 with respect to view 110 may apply to any other suitable application. View 110 includes a canvas 111 on which a user may utilize a stylus 112 to draw lines, shapes, or objects, or supply hand-written words, for example. Stylus 112 is representative of one input instrument, although other instruments are possible, such as mouse devices and touch gestures, as well as any other suitable input device.

An end user may interface with application 103 to produce flow charts, diagrams, basic layout drawings, or any other type of presentation on canvas 111. The user may draw free-form lines, write text, or otherwise create objects on canvas in furtherance of a given presentation, slide show, document, diagram, or other such content.

In an enhancement, application 103 provides the ability to reverse ink on a canvas by way of simply reversing the direction of an input stroke on the canvas. In some implementations, the inking reversal may be performed with just a single input motion, whereas in other implementations, multiple input motions may be performed.

Figure 2:
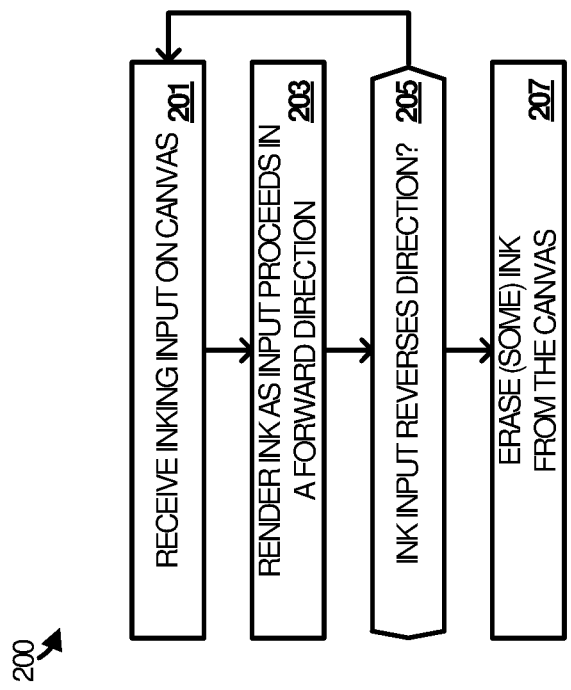
FIG. 2 illustrates an inking process in an implementation.

More particularly, FIG. 2 illustrates inking process 200 which, as mentioned, may be employed by application 103 to allow inking to be erased as described herein. Some or all of the steps of inking process 200 may be implemented in program instructions in the context of a component or components of the application used to carry out the reversible inking feature. The program instructions direct application 103 to operate as follows, referring parenthetically to the steps in FIG. 2 in the context of FIG. 1.

In operation, an inking input 113 is supplied through user interface 105 by way of a user drawing on canvas 111 with stylus 112 and is received by application 103 (step 201). The inking input 113 may begin with an instrument-down action and then proceeds across canvas 111 in a forward direction. Ink 115 is rendered on canvas 111 nearly instantaneously as the inking input 113 proceeds (step 203), although such incremental transitions are not illustrated.

Application 103 continuously monitors for the inking input 113 to reverse direction along its path (step 205). The inking input 113 continues to be received and rendered if the user does not reverse its direction. However, if its direction is reversed, then at least a portion of the ink along the path is erased from the canvas 111 (step 207).

Toward the end of the stroke in this scenario, the user decides to erase a portion of the ink 115 resulting from the inking input 113. Accordingly, the user moves stylus 112 in the reverse direction and retraces a portion of the path traveled by inking input 113. In other words, the direction of inking input 113 is reversed. This action signals to application 103 to erase the portion of ink 115 retraced by the inking input 113 in the reverse direction. The sub-set of ink points covered by the reverse motion of the inking input 113 are thus removed from canvas 111 without the user having to change input modes.

Figure 3:
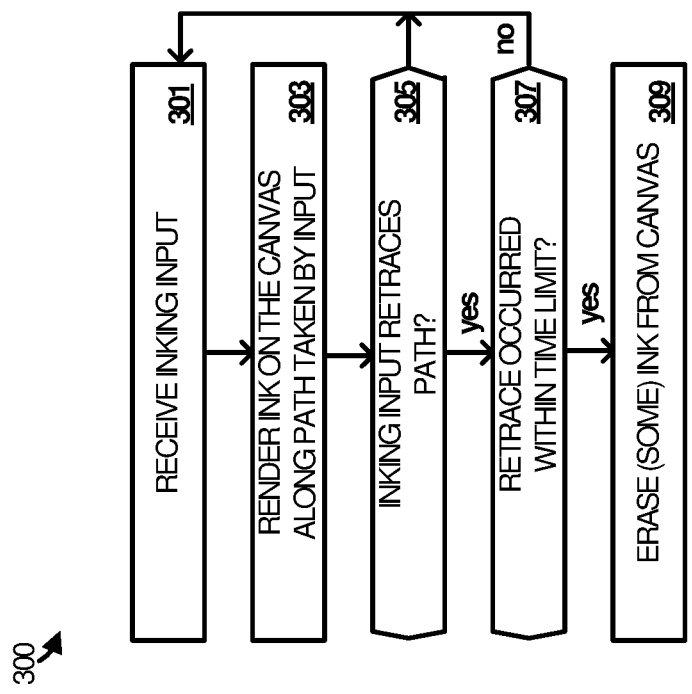
FIG. 3 illustrates another inking process in an implementation.

FIG. 3 illustrates another reversible inking process that may be employed by application 103. Inking process 300 may be employed in cooperation with inking process 200 in some implementations. In other implementations, some or all of the steps in inking process 300 may be integrated with those of inking process 200. Some or all of the steps of inking process 300 may be implemented in program instructions in the context of the component or components of application 103. The program instructions direct application 103 to operate as follows, referring parenthetically to the steps in FIG. 3.

In operation, application 103 receives inking input 113 (step 301) as a user draws on canvas 111 using stylus 112 (or any other suitable input mechanism). Application 103 renders ink on the canvas 111 as the stylus 112 traces a path (step 303).

The application 103 monitors the inking input to determine whether the path has been re-traced (step 305). In an example, the application 103 may compare the location of input coordinates on canvas 111 generated by the inking input against the location of ink points laid down previously on the canvas 111. In addition, a direction vector for a given input coordinate or set of coordinates may be determined. If the coordinates are the same or within a threshold distance from each other, and if the direction vector indicates an opposite direction for the input coordinate(s) relative to the ink point(s), then the inking input may be considered to have reversed directions.

In the case where the inking input 113 is determined to have reversed directions, the application 103 next determines whether or not the retrace occurred within a threshold amount of time (step 307). If not, then the application 103 continues to render ink in correspondence with the inking input. However, if the reversal did occur within a threshold amount of time, then the application 103 picks up or otherwise erases the previously-laid down ink points covered by the new inking input (step 309).

In effect, the may disappear immediately from the canvas 111 as if they had never been drawn in the first instance. In some implementations, an outline or ghost-rendering of the erased ink may be rendered in place of the actual ink, so as to give the user a hint about what was erased. The ghost rendering may persist until it is drawn over or expires after a certain amount of time.

Figure 4:
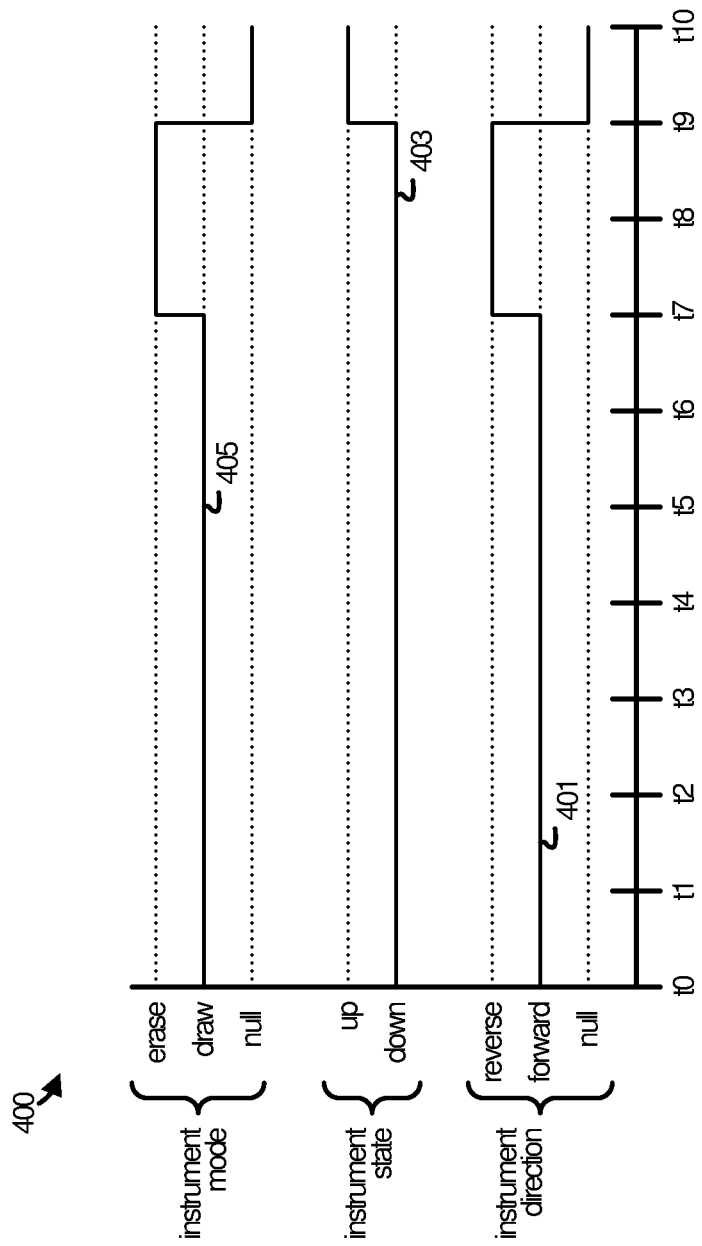
FIG. 4 illustrates a timing diagram in an implementation.

FIG. 4 illustrates a timing diagram 400 in an implementation to demonstrate the relationship between instrument direction 401, instrument state 403, and instrument mode 405. The timing diagram 400 represents how instrument state and instrument direction drive reversible ink as contemplated herein. FIG. 4 in particular represents a scenario in which an inking input is supplied in a single motion.

Timing diagram 400 includes an x-axis defined in terms of time intervals t0-10. The y-axis includes various representations of a drawing stylus in a given scenario. First, instrument direction 401 is shown. A drawing instrument at any given time may be moving in the forward direction, in a reverse direction (relative to the forward direction), or in no direction (null). Next, instrument state 403 is shown. A given instrument may either be in a pen-up state on the canvas or a pen-down state. Finally, the instrument mode 505 is shown. An instrument may either be in an erase mode, a draw mode, or null.

The instrument mode is an output based on the instrument state and the instrument direction as inputs. If the instrument is moving in a forward direction and if the instrument state is down, then the instrument is in a drawing mode. However, if the instrument is moving in reverse while the instrument state is down, then the instrument transitions to the erase mode. If the instrument is in the pen-up state, then its direction is null and the instrument mode is null (or the most recent mode).

In this scenario, the stylus begins its motion in a forward direction with the pen down. Accordingly, it is in draw mode and ink would be surfaced on a canvas. However, at around time t7, the instrument reverses direction and presumably retraces a previously-laid down path. As the stylus remains in a pen-down state, its mode transitions to erase and ink points may be erased from the canvas.

Figure 5:
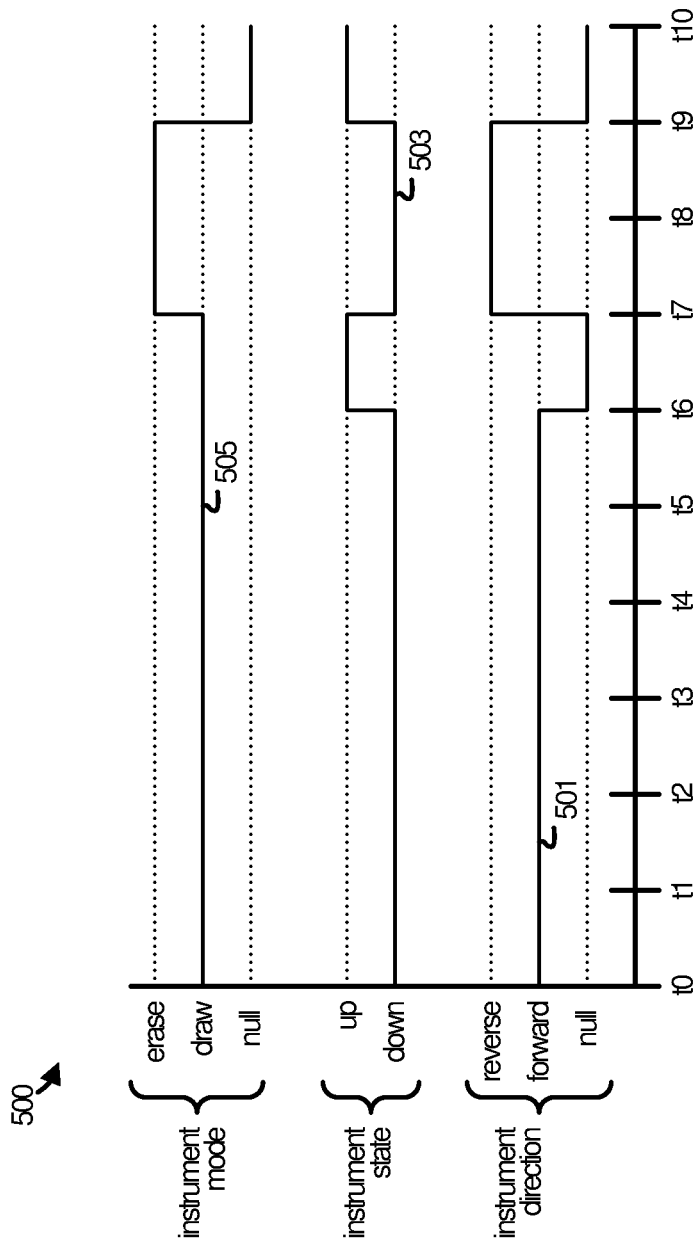
FIG. 5 illustrates another timing diagram in an implementation.

FIG. 5 illustrates another timing diagram in an implementation to demonstrate the relationship between instrument direction 501, instrument state 503, and instrument mode 505, but with respect to an inking input supplied in multiple motions. Timing diagram 500 includes an x-axis defined in terms of time intervals t0-10. The y-axis includes various representations of a drawing stylus in a given scenario.

First, instrument direction 501 is shown. A drawing instrument at any given time may be moving in the forward direction, in a reverse direction (relative to the forward direction), or in no direction (null). Next, instrument state 503 is shown. A given instrument may either be in a pen-up state on the canvas or a pen-down state. Finally, the instrument mode 505 is shown. An instrument may either be in an erase mode, a draw mode, or null.

The instrument mode is an output based on the instrument state and the instrument direction as inputs. If the instrument is moving in a forward direction and if the instrument state is down, then the instrument is in a drawing mode. However, if the instrument is moving in reverse while the instrument state is down, then the instrument transitions to the erase mode. If the instrument is in the pen-up state, then its direction is null and the instrument mode is null (or the most recent mode).

In this scenario, the stylus begins its motion in a forward direction with the pen down. Accordingly, it is in draw mode and ink would be surfaced on a canvas. However, at around time t6, the instrument is lifted from the canvas and enters a pen-up state. The instrument direction is therefore null, although the stylus may remain in a draw state.

However, the instrument is soon thereafter placed back on the canvas and moved in a reverse direction relative to the forward direction. For exemplary purposes, it may be presumed that the stylus retraces some of a previously-laid down path. With the direction in the reverse and the pen down, the instrument mode changes to erase, thereby causing ink points along the path to be erased.

Figure 6:
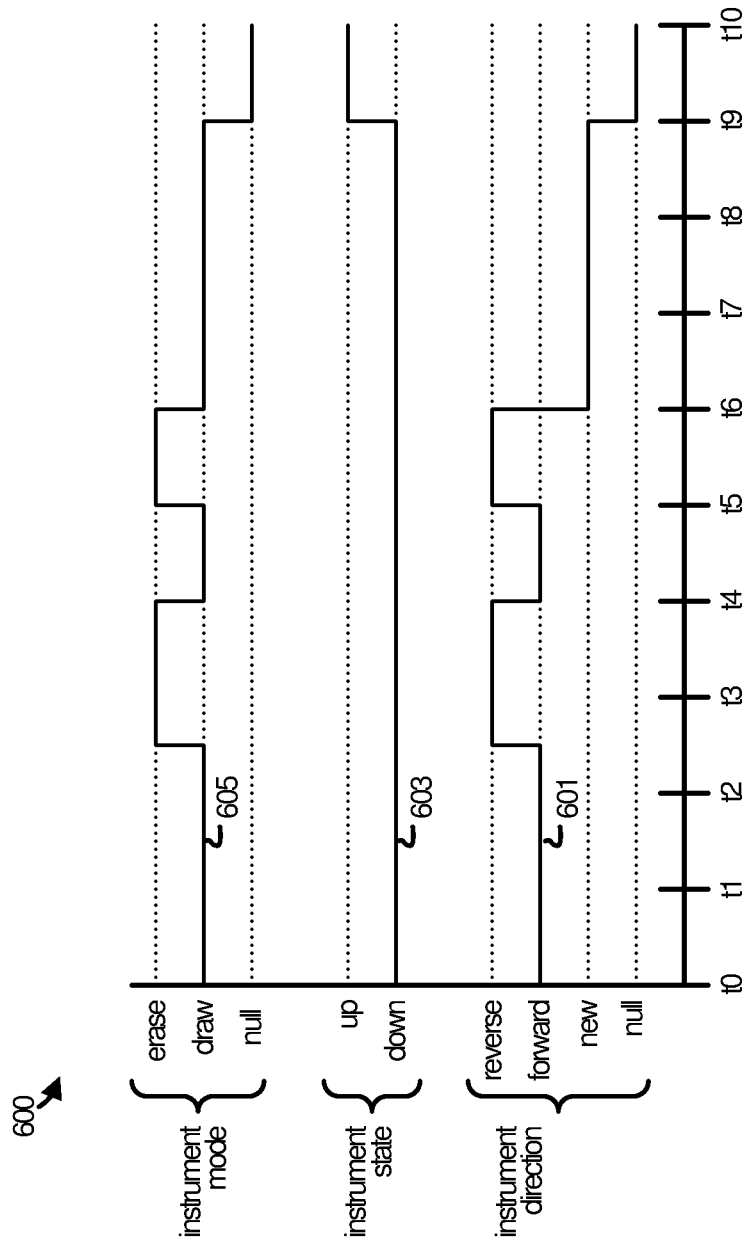
FIG. 6 illustrates another timing diagram in an implementation.

FIG. 6 illustrates yet another timing diagram in an implementation to demonstrate the relationship between instrument direction 601, instrument state 603, and instrument mode 606, but with respect to an inking input supplied in a single motion. However, the instrument mode 605 in this scenario transitions through two changes, as opposed to just one in the previous illustrations.

Timing diagram 600 includes an x-axis defined in terms of time intervals t0-10. The y-axis includes various representations of a drawing stylus in a given scenario. First, instrument direction 601 is shown. A drawing instrument at any given time may be moving in the forward direction, in a reverse direction (relative to the forward direction), or in no direction (null). Next, instrument state 603 is shown. A given instrument may either be in a pen-up state on the canvas or a pen-down state. Finally, the instrument mode 605 is shown. An instrument may either be in an erase mode, a draw mode, or null.

The instrument mode is an output based on the instrument state and the instrument direction as inputs. If the instrument is moving in a forward direction and if the instrument state is down, then the instrument is in a drawing mode. However, if the instrument is moving in reverse while the instrument state is down, then the instrument transitions to the erase mode. If the instrument is in the pen-up state, then its direction is null and the instrument mode is null (or the most recent mode).

In this scenario, the stylus begins its motion in a forward direction with the pen down. Accordingly, it is in draw mode and ink would be surfaced on a canvas. However, at just after time t2, the instrument reverses directions (and presumably stays on-path). The direction reversal while the stylus remains in a pen-down state transitions its mode to erase. Accordingly, ink points may be erased from the canvas as the stylus progresses in the reverse direction along the path.

However, the instrument soon thereafter reverses direction again while remaining on the path and so may be considered to be moving in the forward direction again. The second reversal results in the stylus transitioning automatically to draw mode and ink may be laid down along the same path as the stylus moves forward.

In yet another reversal, the user again reverses the inking input, which causes the stylus to transition back to erase mode. Ink points are again erase while the stylus continues in the reverse direction along the path.

Eventually, the user motions the stylus off the path completely. Transitioning to a new path may be considered neither in the forward direction nor the reverse direction. Rather, the new path takes on its own direction which henceforth becomes the "forward" direction for purposes of detecting reverse motion. Ink points are rendered on the canvas as the stylus travels on the new path until a pen-up event.

Figure 7:
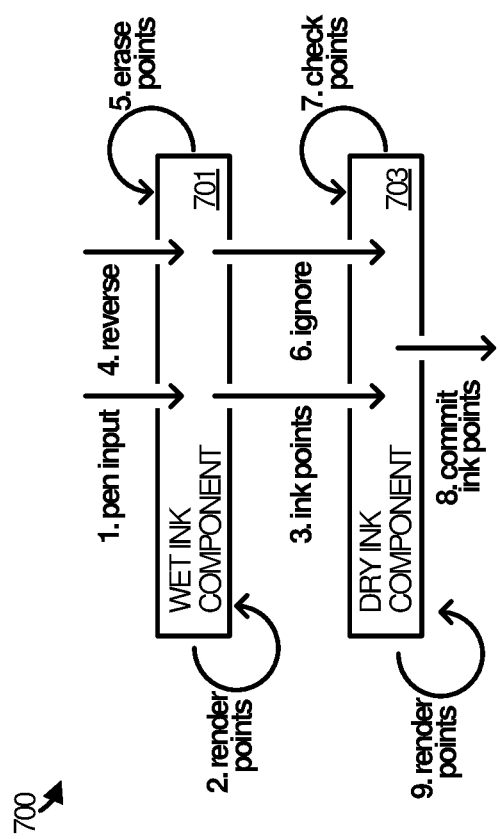
FIG. 7 illustrates a software architecture in an implementation.

FIG. 7 illustrates a software architecture 700 that may be employed in one implementation of reversible ink. Software architecture 700 includes a wet ink component 701 and a dry ink component 703. Wet ink component 701 is representative of one or more software components that may provide a canvas in a user interface and collect pen input as it is supplied to the canvas. Wet ink component 701 may also render ink on the canvas in a "wet" state and in correspondence to the pen input- or erase it therefrom. Ink in a wet state is an object (e.g. free-form line) that has not yet been handed off to a dry ink component for persistent storage in a document, file, notebook, or other such data structure. Wet ink component 701 may be employed as a sub-layer of an operating system layer, although in some scenarios it may be included in the application layer.

Dry ink component 703 is representative of one or more software components that may take ink points reported by a wet ink layer and persist them to storage in the context of an object in a file, document, notebook, or other such data structure. Dry ink component 703 may be employed as a sub-layer of an application, although it may also be employed in the context of an operating system layer in some implementations.

In operation, pen input is received by wet ink component 701. Corresponding ink points are rendered on a canvas by wet ink component 701 so as to give the visual effect of digital inking on the canvas.

The ink points are periodically (or at some other interval) communicated to dry ink component 703. However, at the same time (or substantially the same time), wet ink component 701 may receive pen input indicating a reverse motion. Accordingly, wet ink component 701 immediately erases at least some of the ink points that were drawn in response to the previous pen input. Wet ink component 701 also communicates an "ignore" instruction to dry ink component 703, alerting the component to the fact that some of the ink points were erased.

Dry ink component 703 runs a check loop before committing ink points to an object. The loop checks on whether an ignore instruction has been received from wet ink component 701 since the last persist operation. If no instruction has been received, then dry ink component can commit the previously-received ink points to their object. However, if an ignore instruction has been received, then dry ink component 703 can take one of various actions.

In one option, dry ink component 703 may refrain from persisting any of the ink points that were provided to it by wet ink component 701. Rather, dry ink component 703 can simply wait for the next set of ink points to be sent by wet ink component 701. In such a scenario, wet ink component 701 would be coordinated with dry ink component 703 such that it would know to resend all of the necessary ink points to dry ink component 703.

In another option, dry ink component 703 may commit only a subset of the ink points that were provided by wet ink component 701. The remaining ink points not persisted would be those that were subject to the erase operation by wet ink component 701. However, this option would also require sufficient coordination with wet ink component 701 in that the specific ink points that were erased would need to be identified to dry ink component 703.

Most objects are eventually rendered in a dry state by dry ink component 703. For example, a free-form line that was partially erased is eventually persisted to an object model by dry ink component 703 in the larger context of a canvas, a view, a document, a notebook, or other such data structures. Rendering of the free-form line may be handed-off to dry ink component 703 so that rendering for new pen input may be handled by wet ink component 701.

FIG. 8 illustrates computing system 801, which is representative of any system or collection of systems in which the various applications, architectures, services, scenarios, and processes disclosed herein may be implemented. Examples of computing system 801 include, but are not limited to, desktop computers, laptop computers, tablet computers, computers having hybrid form-factors, mobile phones, smart televisions, wearable devices, server computers, blade servers, rack servers, and any other type of computing system (or collection thereof) suitable for carrying out the reversible ink operations described herein. Such systems may employ one or more virtual machines, containers, or any other type of virtual computing resource in the context of reversible ink.

Computing system 801 may be implemented as a single apparatus, system, or device or may be implemented in a distributed manner as multiple apparatuses, systems, or devices. Computing system 801 includes, but is not limited to, processing system 802, storage system 803, software 805, communication interface system 807, and user interface system 809. Processing system 802 is operatively coupled with storage system 803, communication interface system 807, and user interface system 809.

Processing system 802 loads and executes software 805 from storage system 803. Software 805 includes application 806 which is representative of the software applications discussed with respect to the preceding FIGS. 1-7, including application 103. When executed by processing system 802 to support reversible ink in a user interface, application 806 directs processing system 802 to operate as described herein for at least the various processes, operational scenarios, and sequences discussed in the foregoing implementations. Computing system 801 may optionally include additional devices, features, or functionality not discussed for purposes of brevity.

Referring still to FIG. 8, processing system 802 may comprise a micro-processor and other circuitry that retrieves and executes software 805 from storage system 803. Processing system 802 may be implemented within a single processing device, but may also be distributed across multiple processing devices or sub-systems that cooperate in executing program instructions. Examples of processing system 802 include general purpose central processing units, application specific processors, and logic devices, as well as any other type of processing device, combinations, or variations thereof.

Storage system 803 may comprise any computer readable storage media readable by processing system 802 and capable of storing software 805. Storage system 803 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 803 may also include computer readable communication media over which at least some of software 805 may be communicated internally or externally. Storage system 803 may be implemented as a single storage device, but may also be implemented across multiple storage devices or sub-systems co-located or distributed relative to each other. Storage system 803 may comprise additional elements, such as a controller, capable of communicating with processing system 802 or possibly other systems.

Software 805 in general, and application 806 in particular, may be implemented in program instructions and among other functions may, when executed by processing system 802, direct processing system 802 to operate as described with respect to the various operational scenarios, sequences, and processes illustrated herein. For example, application 806 may include program instructions for implementing a reversible ink process, such as inking processes 200 and 300.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 805 may include additional processes, programs, or components, such as operating system software, virtual machine software, or other application software, in addition to or that include application 806. Software 805 may also comprise firmware or some other form of machine-readable processing instructions executable by processing system 802.

In general, application 806 may, when loaded into processing system 802 and executed, transform a suitable apparatus, system, or device (of which computing system 801 is representative) overall from a general-purpose computing system into a special-purpose computing system customized to perform reversible ink operations. Indeed, encoding application 806 on storage system 803 may transform the physical structure of storage system 803. The specific transformation of the physical structure may depend on various factors in different implementations of this description. Examples of such factors may include, but are not limited to, the technology used to implement the storage media of storage system 803 and whether the computer-storage media are characterized as primary or secondary storage, as well as other factors.

For example, if the computer readable storage media are implemented as semiconductor-based memory, application 806 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 807 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 809 may include a keyboard, a stylus (digital pen), a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 809. In some cases, the input and output devices may be combined in a single device, such as a display capable of displaying images and receiving touch gestures. The aforementioned user input and output devices are well known in the art and need not be discussed at length here.

User interface system 809 may also include associated user interface software executable by processing system 802 in support of the various user input and output devices discussed above. Separately or in conjunction with each other and other hardware and software elements, the user interface software and user interface devices may support a graphical user interface, a natural user interface, or any other type of user interface, in which a user interface to an application may be presented (e.g. user interface 105).

Communication between computing system 801 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

The invention claimed is:

1. A computing apparatus comprising:
   one or more computer readable storage media;
   a processing system operatively coupled with the one or more computer readable storage media; and
   program instructions stored on the one or more computer readable storage media that, when executed by the processing system, direct the processing system to at least:

receive inking input on a canvas in a user interface to an application;

render ink in a wet state on the canvas along a path taken by the inking input;

communicate to a dry ink component the inking input for persistent storage;

monitor for the inking input to reverse direction along the path; and in response to the inking input reversing the direction along the path, erase at least a portion of the ink in a wet state from the canvas and communicate to the dry ink component an ignore instruction.

2. The computing apparatus of claim 1 wherein the program instructions further direct the processing system to monitor for the inking input to reverse the direction again and, in response to the inking input reversing the direction again, continue to render the ink on the canvas along a new path taken by the inking input.

3. The computing apparatus of claim 1 wherein the inking input comprises only a single inking motion that begins with an instrument-down action, ends with an instrument-up action, and touches the canvas continuously in between.

4. The computing apparatus of claim 1 wherein the inking input comprises multiple inking motions that each begin with an instrument down-action, end with an instrument-up action, and touch the canvas continuously in between.

5. The computing apparatus of claim 1 wherein, to monitor for the inking input to reverse the direction along the path, the program instructions direct the processing system to monitor for the inking input to retrace a last portion of the path after reversing the direction.

6. The computing apparatus of claim 5 wherein the program instructions further direct the processing system to monitor for the inking input to retrace the last portion of the path within a threshold amount of time after reversing the direction.

7. The computing apparatus of claim 6 wherein to monitor for the inking input to retrace the last portion of the path, the program instructions direct the processing system to monitor for the inking input to come within a threshold distance from the path.

8. The computing apparatus of claim 1 wherein a stylus supplies the inking input in a drawing mode throughout an entirety of the inking input.

9. A method of operating an application in support of a reversible ink feature, the method comprising:

receiving inking input on a canvas in a user interface to the application;

rendering ink in a wet state on the canvas along a path taken by the inking input;

communicating to a dry ink component the inking input for persistent storage;

monitoring for the inking input to reverse direction along the path; and in response to the inking input reversing the direction along the path, erasing at least a portion of the ink in a wet state from the canvas and communicating to the dry ink component an ignore instruction.

10. The method of claim 9 further comprising monitoring for the inking input to reverse the direction again and, in response to the inking input reversing the direction again, continuing to render the ink on the canvas along a new path taken by the inking input.

11. The method of claim 9 wherein the inking input comprises only a single inking motion that begins with an instrument-down action, ends with an instrument-up action, and touches the canvas continuously in between.

12. The method of claim 9 wherein the inking input comprises multiple inking motions that each begin with an instrument down-action, end with an instrument-up action, and touch the canvas continuously in between.

13. The method of claim 9 wherein monitoring for the inking input to reverse the direction along the path comprises monitoring for the inking input to retrace a last portion of the path after reversing the direction.

14. The method of claim 13 further comprising monitoring for the inking input to retrace the last portion of the path within a threshold amount of time after reversing the direction.

15. The method of claim 14 wherein monitoring for the inking input to retrace the last portion of the path comprises monitoring for the inking input to come within a threshold distance from the path.

16. The method of claim 9 wherein a stylus supplies the inking input in a drawing mode throughout an entirety of the inking input.

17. One or more non-transitory computer readable storage media having program instructions stored thereon for facilitating reversible ink, wherein the program instructions, when executed by a processing system, direct the processing system to at least:

receive inking input on a canvas in a user interface to an application;

render ink in a wet state on the canvas along a path taken by the inking input;

communicate to a dry ink component the inking input for persistent storage;

monitor for the inking input to reverse direction along the path; and in response to the inking input reversing the direction along the path, erase at least a portion of the ink in a wet state from the canvas and communicate to the dry ink component an ignore instruction.

18. The one or more non-transitory computer readable storage media of claim 17 wherein the inking input comprises only a single inking motion that begins with an instrument-down action, ends with an instrument-up action, and touches the canvas continuously in between.

19. The one or more non-transitory computer readable storage media of claim 17 wherein the inking input comprises multiple inking motions that each begin with an instrument down-action, end with an instrument-up action, and touch the canvas continuously in between.

20. The one or more non-transitory computer readable storage media of claim 17 wherein, to monitor for the inking input to reverse the direction along the path, the program instructions direct the processing system to monitor for the inking input to retrace a last portion of the path after reversing the direction within a threshold amount of time after reversing the direction.

* * * * *